US009059805B2

(12) United States Patent
Mak et al.

(10) Patent No.: US 9,059,805 B2
(45) Date of Patent: Jun. 16, 2015

(54) OPTIMUM MODULATOR BIAS SYSTEMS AND METHODS IN COHERENT OPTICAL TRANSMITTERS

(71) Applicants: Gary Mak, Ottawa (CA); Yves Beaulieu, Gatineau (CA); Mohammad Sotoodeh, Ottawa (CA)

(72) Inventors: Gary Mak, Ottawa (CA); Yves Beaulieu, Gatineau (CA); Mohammad Sotoodeh, Ottawa (CA)

(73) Assignee: Ciena Corporation, Hanover, MD (US)

( * ) Notice: Subject to any disclaimer, the term of this patent is extended or adjusted under 35 U.S.C. 154(b) by 99 days.

(21) Appl. No.: 13/860,827

(22) Filed: Apr. 11, 2013

(65) Prior Publication Data

US 2014/0308047 A1  Oct. 16, 2014

(51) Int. Cl.
*H04B 10/50* (2013.01)
*H04B 10/54* (2013.01)
*H04B 10/556* (2013.01)

(52) U.S. Cl.
CPC .... *H04B 10/50575* (2013.01); *H04B 10/50577* (2013.01); *H04B 10/541* (2013.01); *H04B 10/5561* (2013.01)

(58) Field of Classification Search
CPC ................ H04B 10/50577; H04B 10/50575; H04B 10/541; H04B 10/5561
USPC .......................................................... 398/198
See application file for complete search history.

(56) References Cited

U.S. PATENT DOCUMENTS

| | | | |
|---|---|---|---|
| 6,842,561 B2 | 1/2005 | Mak et al. | |
| 7,023,601 B2 | 4/2006 | McGhan et al. | |
| 7,321,702 B2 | 1/2008 | Akiyama et al. | |
| 7,379,223 B2 | 5/2008 | Webb et al. | |
| 7,483,641 B1 | 1/2009 | Mak | |
| 7,787,778 B2 | 8/2010 | Harley et al. | |
| 7,945,226 B2 | 5/2011 | Mak | |
| 8,059,970 B2 | 11/2011 | Harley et al. | |
| 8,401,399 B2 | 3/2013 | Barton et al. | |
| 2002/0149824 A1 | 10/2002 | Beaulieu et al. | |
| 2004/0208635 A1* | 10/2004 | Sinsky | 398/183 |
| 2005/0002675 A1* | 1/2005 | Sardesai et al. | 398/183 |
| 2008/0002991 A1* | 1/2008 | Masuda et al. | 398/198 |
| 2010/0272446 A1 | 10/2010 | Harley et al. | |
| 2010/0278536 A1 | 11/2010 | Mak et al. | |
| 2012/0251032 A1 | 10/2012 | Kato | |

* cited by examiner

*Primary Examiner* — Leslie Pascal
(74) *Attorney, Agent, or Firm* — Clements Bernard PLLC; Christopher L. Bernard; Lawrence A. Baratta, Jr.

(57) ABSTRACT

A modulator bias selection method, a coherent optical transmitter, and optical modulator solve the problem of generating a correct constellation using the bias points with the minimum phase adjustment range. The optimum modulator bias systems and methods include a coherent optical transmitter with control of four (XI, XQ, YI, YQ) quadrature data signals via a transmitter (Tx) application specific integrated circuit (ASIC), with a modulator bias controller which implements an algorithm to find the optimum bias points. The optimum bias points yield a correct constellation with minimum phase/bias adjustment. An algorithm is used to find the optimum bias solution using fast, simple method, adjusting only one quadrature at a time and exploiting a control feature of the Tx ASIC. This algorithm is significantly simpler than a generalized search, is a local algorithm, and uses only DC power measurement at the transmitter.

20 Claims, 6 Drawing Sheets

OPTIMUM MODULATOR BIAS SYSTEMS AND METHODS IN COHERENT OPTICAL TRANSMITTERS

FIELD OF THE DISCLOSURE

The present disclosure relates generally to optical communication systems and methods. More particularly, the present disclosure relates to optimum modulator bias systems and methods in coherent optical transmitters.

BACKGROUND OF THE DISCLOSURE

In next generation optical modems (e.g., 100 Gb/s and beyond), and in particular in transmitters, there is a requirement for greater optical performance (via better control of optical modulators) and for allowing a wider choice of vendors/technologies (i.e. different lithium niobate (LiNbO$_3$) modulator vendors or indium phosphide (InP) photonic integration technologies). In particular, the new InP technology is prized for its small size and anticipated lower cost (and consequently is proposed to be used in next gen small-form-factor pluggable optics). One of the most important functions of transmitter control is to bias a modulator so it transmits a distortion free and correct optical data constellation via selecting the correct "bias points" (optical phase points). Conventionally, lithium niobate modulators have been used which have a large (optical) phase adjustment range and therefore, flexible modulator bias points. By flexible modulator bias points, this means that there is more than one set of bias points available with about the same optical performance. Using lithium niobate modulators, a generalized search can be implemented to find "reasonable" bias points, but these are not necessarily optimum points. That is, there is little performance degradation when operating at non-optimum bias points. InP technology has a relatively small phase adjustment range and thus, if a poor hardware scheme and algorithm for bias point selection is used, the correct constellation cannot be generated or unnecessary cost is added due to rejected modulators. Also, InP modulators have twice the phase controls, so for each modulator polarization, the search space is much larger: 6-dimensional vs. 3-dimensional (for LiNbO$_3$). In addition, because of InP physics, it is necessary to find the minimum phase bias points to get best cost and performance.

BRIEF SUMMARY OF THE DISCLOSURE

In an exemplary embodiment, a modulator bias selection method includes, for each pair of inner phase adjusters of an optical modulator, selecting a minimum bias point by sweeping a left phase adjuster and a right phase adjuster of each of the inner phase adjusters to find the minimum bias point; for each pair of outer phase adjusters, selecting a half-power bias point by separately sweeping a left phase adjuster and a right phase adjuster of each of the outer phase adjusters to find the half-power bias point; and setting the pair of inner phase adjusters and the pair of outer phase adjusters based on the selecting steps, wherein the modulator bias selection method includes a local algorithm. The modulator bias selection method can further include performing the selecting steps and the setting step for each polarization, in-phase and quadrature, of the optical modulator. The modulator bias selection method can further include, during the selecting the minimum bias point step, using any one of a plurality of detectors to find the minimum bias point; and, during the selecting the half-power bias point step, using one of an inner detector of the plurality of detectors or an external detector of the plurality of detectors. The modulator bias selection method can further include selecting the minimum bias point when a phase of a left phase amount minus a right phase amount plus an offset phase amount equals 0, +/−2, +/−4, . . . ; and selecting a smaller of the magnitude of the left phase amount and the right phase amount for the setting step.

The modulator bias selection method can further include, prior to the selecting the half-power bias point step, setting a left phase adjuster and a right phase adjuster of each of the inner phase adjusters such that the optical modulator is biased at a maximum bias point. For the inner phase adjusters PH_L is a value of the left phase adjuster at the minimum bias point and PH_R is a value of the right phase adjuster at the minimum bias point; wherein for the outer phase adjusters PH_PL is a value of the left phase adjuster at the half-power bias point and PH_PR is a value of the right phase adjuster at the half-bias point; and the method can further include, if the optical modulator is bipolar performing the steps of: selecting values for the inner phase adjusters based on if PH_L is smaller than PH_R and PH_L=K, then PH_L=K/2 and PH_R=−K/2, else PH_R=K/2 and PH_L=−K/2; and selecting values for the outer phase adjusters based on if PH_PL smaller than PH_PR and PH_PL=K, then PH_PL=K/2 and PH_PR=−K/2, else PH_PR=K/2, PH_PL=−K/2; and if the optical modulator is not bipolar performing the steps of: selecting for the inner phase adjusters values based on if PH_L is smaller than PH_R and PH_L=K, then PH_L=K and PH_R=0, else PH_R=K and PH_L=0; and selecting for the output phase adjusters based on if PH_PL smaller than PH_PR and PH_PL=K, then PH_PL=K and PH_PR=0, else PH_PR=K, PH_PL=0.

The modulator bias selection method can further include, depending on a slope of power versus phase in the selecting the half-power bias point step, selectively performing data inversion to get a desired constellation; wherein data inversion can include one of inverting a transfer function in a digital filter coupled to a digital input or inverting an analog amplifier gain of an analog amplifier coupled to an analog output; wherein data inversion is selectively performed either for an in-phase component or a quadrature component. The modulator bias selection method can further include selecting the minimum bias point when a phase of a left phase amount minus a right phase amount plus an offset phase amount equals 0, +/−2, +/−4, . . . ; selecting a smaller of the magnitude of the left phase amount and the right phase amount for the setting step; and, if the optical modulator is bipolar, dividing the smaller of the magnitude of the left phase amount and the right phase amount for the setting step by two and setting the other magnitude to a same value with a negative sign. The modulator bias selection method can further include setting feedback controller polarity based on a slope of power versus phase in the selecting the half-power bias point step. Optionally, the optical modulator includes a lithium niobate optical modulator, an indium phosphate optical modulator, and/or a quad-parallel Mach-Zehnder modulator.

In another exemplary embodiment, a coherent optical transmitter includes an optical modulator system including a plurality of modulators and a plurality of detectors monitoring outputs of the plurality of modulators; a modulator bias controller communicatively coupled to the plurality of detectors monitoring outputs and providing phase bias control to a plurality of phase adjusters associated with the plurality of modulators; transmitter circuitry receiving a digital input and providing an analog output to the plurality of modulators; and a modulator bias selection algorithm operating between the optical modulator system, the modulator bias controller, and the transmitter circuitry to select optimum phases for the plurality of phase adjusters in a local and non-iterative manner. The transmitter circuitry can include a digital transfer function, H, applied to the digital input; a digital to analog converter receiving an output of the digital transfer function, H; and an analog amplifier with gain, G, receiving an output of the digital to analog converter; wherein the plurality of modulators can be bipolar, and wherein the modulator bias selection algorithm can selectively performs data inversion on one of the gain, G, or the digital transfer function, H, to get a desired constellation.

The modulator bias selection algorithm can cause the transmitter circuitry and the modulator bias controller to perform the steps of: for each pair of inner phase adjusters of the optical modulator system, selecting a minimum bias point by sweeping a left phase adjuster and a right phase adjuster of each of the inner phase adjusters to find the minimum bias point; for each pair of outer phase adjusters of the optical modulator system, selecting a half-power bias point by separately sweeping a left phase adjuster and a right phase adjuster of each of the outer phase adjusters to find the half-power bias point; and setting the pair of inner phase adjusters and the pair of outer phase adjusters based on the selecting steps. The modulator bias selection algorithm can use any one of the plurality of detectors to find the minimum bias point during the selecting the minimum bias point step; and wherein the modulator bias selection algorithm can use one of an inner detector of the plurality of detectors or an external detector of the plurality of detectors during the selecting the half-power bias point step.

For the inner phase adjusters PH_L is a value of the left phase adjuster at the minimum bias point and PH_R is a value of the right phase adjuster at the minimum bias point; wherein for the outer phase adjusters PH_PL is a value of the left phase adjuster at the half-power bias point and PH_PR is a value of the right phase adjuster at the half-bias point; and the modulator bias selection algorithm can cause the transmitter circuitry and the modulator bias controller to perform the steps of: if the optical modulator is bipolar performing the steps of: selecting values for the inner phase adjusters based on if PH_L is smaller than PH_R and PH_L=K, then PH_L=K/2 and PH_R=−K/2, else PH_R=K/2 and PH_L=−K/2; and selecting values for the outer phase adjusters based on if PH_PL smaller than PH_PR and PH_PL=K, then PH_PL=K/2 and PH_PR=−K/2, else PH_PR=K/2, PH_PL=−K/2; and if the optical modulator is not bipolar performing the steps of: selecting for the inner phase adjusters values based on if PH_L is smaller than PH_R and PH_L=K, then PH_L=K and PH_R=0, else PH_R=K and PH_L=0; and selecting for the output phase adjusters based on if PH_PL smaller than PH_PR and PH_PL=K, then PH_PL=K and PH_PR=0, else PH_PR=K, PH_PL=0.

In yet another exemplary embodiment, and optical modulator includes N phase adjustment points; M detectors associated with the N phase adjustment points, N≥M; circuitry communicatively coupled to the N phase adjustment points and the M detectors, wherein the circuitry is configured to: for each pair of inner adjustment points of the N phase adjustment points, select a minimum bias point by sweeping a left phase adjustment point and a right phase adjustment point of each of the inner adjustment points to find the minimum bias point where a phase of a left phase amount minus a right phase amount plus an offset phase amount equals 0, +/−2, +/−4, . . . ; for each pair of outer phase adjustment points of the N phase adjustment points, select a half-power bias point by separately sweeping a left phase adjustment point and a phase adjustment point of each of the outer phase adjustment points to find the half-power bias point; and set the pair of inner phase adjustment points and the pair of phase adjustment points based on the select steps at an optimum value determined in a local and non-iterative manner. The optical modulator can be a quad-parallel Mach-Zehnder modulator.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to optimum modulator bias systems and methods in coherent optical transmitters. The optimum modulator bias systems and methods solve the problem of generating the correct constellation using the (bias points) with the minimum phase adjustment range. The optimum modulator bias systems and methods include a coherent optical transmitter with control of four (XI, XQ, YI, YQ) quadrature data signals via a transmitter (Tx) application specific integrated circuit (ASIC), with a modulator bias controller which implements an algorithm to find the optimum bias points. The optimum bias points yield a correct constellation with minimum phase/bias adjustment. An algorithm is used to find the optimum bias solution using fast, simple method, adjusting only one quadrature at a time and exploiting a control feature of the Tx ASIC. This algorithm is significantly simpler than a generalized search, is a local algorithm, and uses only DC power measurement at the transmitter.

Figure 1:
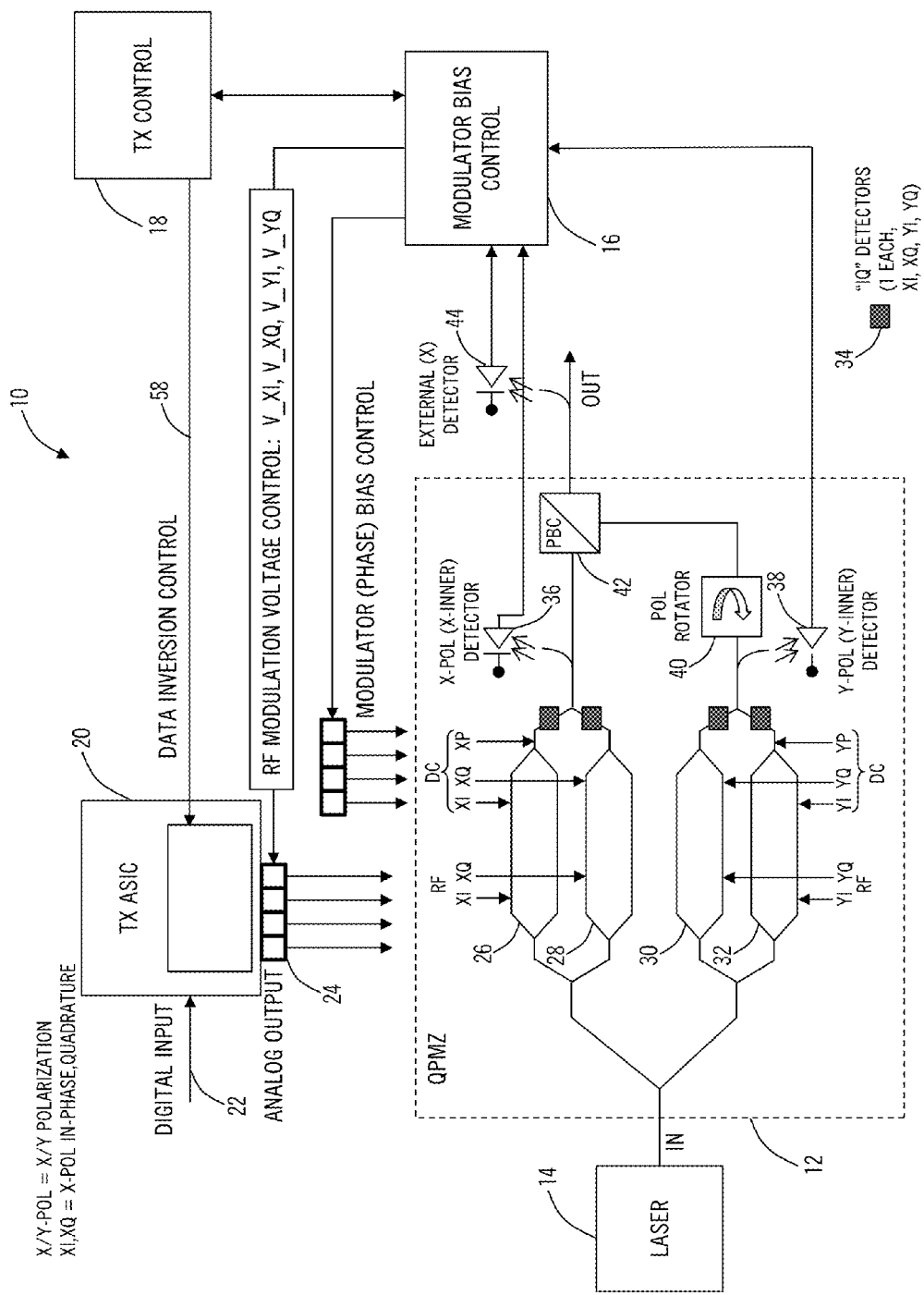
FIG. 1 is a block diagram of an optical modulator system with optimum bias control.

Referring to FIG. 1, in an exemplary embodiment, a block diagram illustrates an optical modulator system 10 with optimum bias control. The optical modulator system 10 includes a combination of optical and electrical components such as, for example, a quad-parallel Mach-Zehnder (QPMZ) modulator 12, a laser 14, modulator bias controller 16, transmitter (Tx) controller 18, and a Tx ASIC 20. The laser 14 is communicatively coupled to the modulator 12 providing a laser output thereto which is modulated by the modulator 12. The modulator 12 is used for multi-value modulation methods such as N-quadrature amplitude modulation (QAM), differential quadrature phase shift keying (DQPSK), etc. In general, when any multi-value modulation methods are use, an in-phase/quadrature (I/Q) modulator is used as the optical modulator 12. The I/Q modulator 12 is an optical modulator capable of independently generating orthogonal optical electric field components (I channel and Q channel) and has a structure in which Mach-Zehnder (MZ) modulators are connected in parallel. For example, the QPMZ modulator 12 can also be referred to as a dual parallel MZ modulator and can be used in a 16-QAM modulation scheme in the optical modulator system 10. As is shown in FIG. 1, there are an increased number of modulator bias points in the QPMZ modulator 12 which need to be optimized with the optimum bias control.

The Tx ASIC 20 receives a digital information stream at a digital input 22 and converts the digital information stream appropriately, based on an associated modulation scheme, for driving the modulator 12 via analog outputs 24. The analog outputs 24 are communicatively coupled to the modulator 12 (labeled Radio Frequency (RF) XI, XQ, YI, YQ, where X, Y denotes polarization and I, Q denote in-phase and quadrature, respectively). The modulator 12 includes four modulators 26, 28, 30, 32 including a XI modulator 26, a XQ modulator 28, a YI modulator 30, and a YQ modulator 32. A detector 34 (also referred to as a tap-detector interchangeably) is included at an output of each of the modulators 26, 28, 30, 32. The modulators 26, 28, 30, 32 can be referred to as inner modulators and can be either amplitude, phase, or mixed phase/amplitude modulators. In an exemplary embodiment, the modulators 26, 28, 30, 32 can be phase modulators. Additionally, the modulator 12 include an X-polarization detector 36 coupled to a combined output of the modulators 26, 28 and a Y-polarization detector 38 coupled to a combined output of the modulators 30, 32. A polarization rotator 40 can be connected to the combined output of the modulators 30, 32. A polarization beam combiner 42 can be connected to the combined output of the modulators 26, 28 and the combined output of the modulators 30, 32. An output of the polarization beam combiner 42 provides a modulated output of the modulator 12, and an external detector 44 can be tapped off the output. The various detectors 34, 36, 38, 44 are communicatively coupled to the modulator bias controller 16.

The Tx controller 18, in this exemplary embodiment, implements a "optimum bias point selection" algorithm, controls the Tx ASIC 20, and the modulator bias controller 16. Specifically, the Tx controller 18 controls the modulator bias controller 16 in the following ways: (i) open loop control: bias control loops are opened enabling direct control of biases and measurement of the detectors 34, 36, 38, 44, (ii) closed loop control: sets the feedback polarity of the modulator bias controller 16, but the modulator bias controller 16 itself implements the feedback control. The Tx controller's 18 algorithm finds the optimum bias points; the modulator bias controller 16 is responsible for maintaining those points in service.

Figure 2:
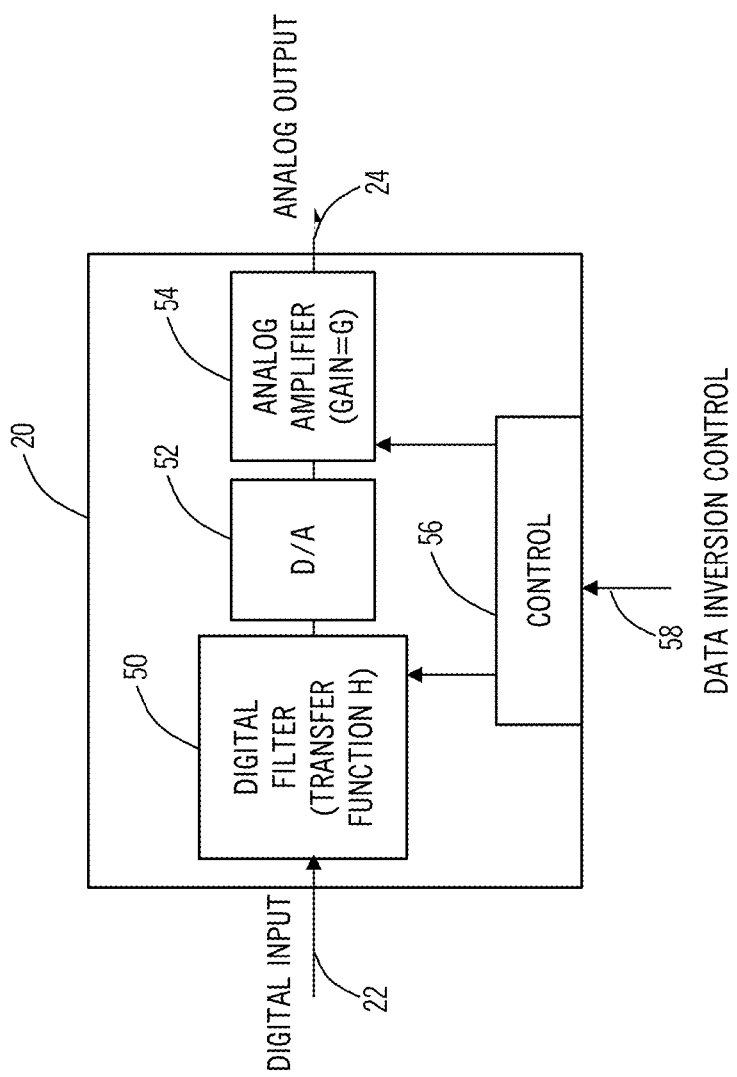
FIG. 2 is a block diagram of functional details associated with the Transmitter (Tx) ASIC in FIG. 1.

Referring to FIG. 2, in an exemplary embodiment, a block diagram illustrates functional details associated with the Tx ASIC 20. The Tx ASIC 20 includes a digital filter 50 receiving the digital input 22 and including a transfer function, H, a digital-to-analog (D/A) converter 52 connected to an output of the digital filter 50, and an analog amplifier 54 connected to an output of the D/A converter 52 and including gain, G. An output of the analog amplifier 54 provides the analog output 24 to the modulator 12. A controller 56 is connected to the digital filter 50 and the analog amplifier 54 for controlling the transfer function, H, and the gain, G, responsive to a data inversion control signal 58 from the Tx controller 18.

Figure 3:
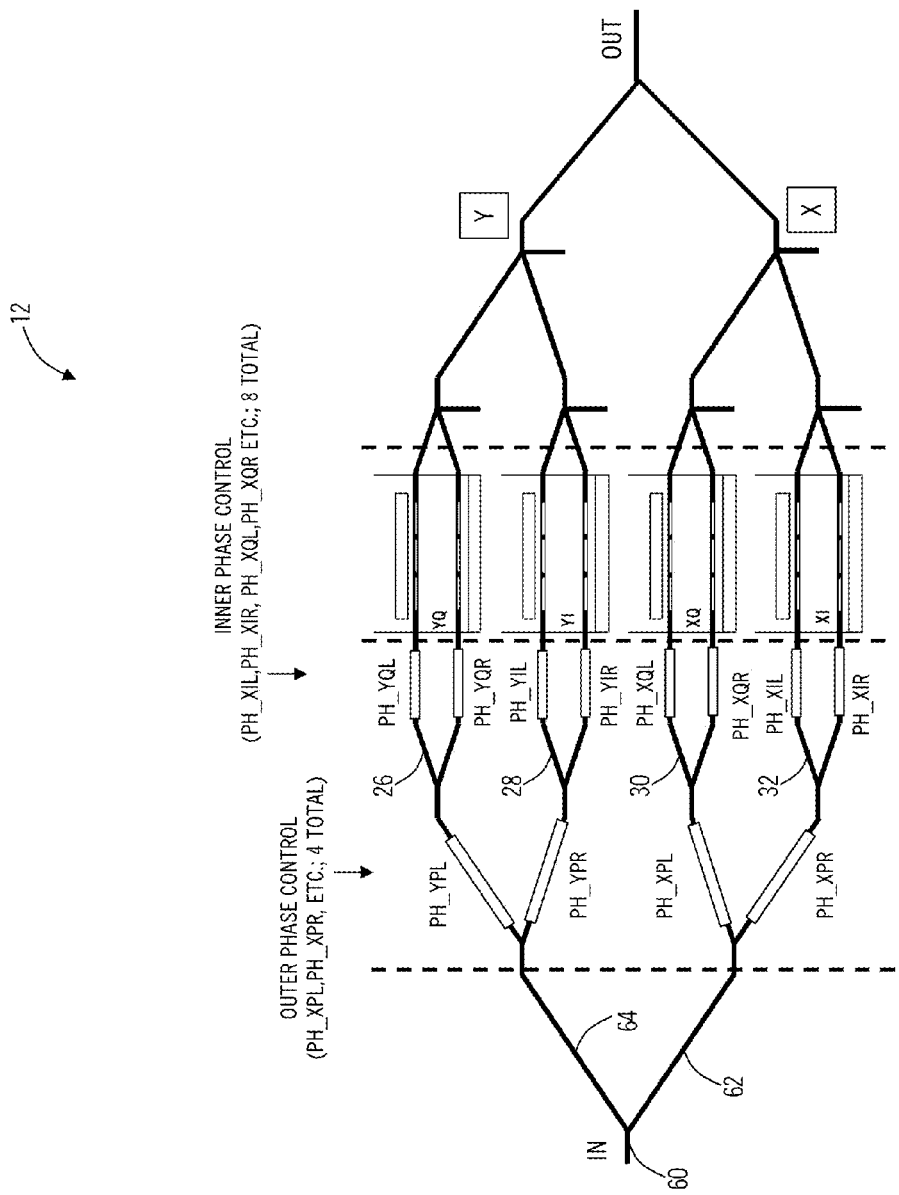
FIG. 3 is a schematic diagram illustrates details of the quad-parallel Mach-Zehnder (QPMZ) modulator of FIG. 1 showing locations and naming of phase/bias control ports.

Referring to FIG. 3, in an exemplary embodiment, a schematic diagram illustrates details of the QPMZ modulator showing locations and naming of phase/bias control ports. The locations and naming of phase/bias control ports are used in the foregoing descriptions of the optimum bias control. The modulator 12 includes an input 60 which is split between an X polarization 62 and a Y polarization 64. The X polarization 62 is split again with associated phase/bias control points PH_XPL, PH_XPR where PH is used to denote phase, X to denote the X polarization, P to denote these are outer phase control points, and L and R for left and right to distinguish therebetween. The Y polarization 64 is split again with associated phase/bias control points PH_YPL, PH_YPR where PH is used to denote phase, Y to denote the Y polarization, P to denote these are outer phase control points, and L and R for left and right to distinguish therebetween. Thus, from an outer phase control perspective, there are four phase/bias control points PH_XPL, PH_XPR, PH_YPL, PH_YPR.

At an output of the phase/bias control point PH_XPR, there are two additional phase/bias control points PH_XIL, PH_XIR where PH is used to denote phase, X to denote the X polarization, I to denote in-phase, and L and R for left and right to distinguish therebetween. At an output of the phase/bias control point PH_XPL, there are two additional phase/bias control points PH_XQL, PH_XQR where PH is used to denote phase, X to denote the X polarization, Q to denote quadrature, and L and R for left and right to distinguish therebetween. At an output of the phase/bias control point PH_YPR, there are two additional phase/bias control points PH_YIL, PH_YIR where PH is used to denote phase, Y to denote the Y polarization, I to denote in-phase, and L and R for left and right to distinguish therebetween. At an output of the phase/bias control point PH_YPL, there are two additional phase/bias control points PH_YQL, PH_YQR where PH is used to denote phase, Y to denote the Y polarization, Q to denote quadrature, and L and R for left and right to distinguish therebetween.

The problem statement of the optimum bias control is as follows. The optical electric field at the output of the transmitter can be described by: (for one polarization)

$$E = E_I \cdot e^{(j\pi(PH\_PR + PHOffset\_P))} + E_Q \cdot e^{(j\pi(PH\_PL))}$$

where:

$$E_I = A_I \cdot e^{\left(j\frac{\pi}{2}(PH\_IL + PH\_IR + PHOffset\_I)\right)} \cdot \sin\left(\frac{\pi}{2}V\_I\right) \cdot \cos\left(\frac{\pi}{2}M\_I\right)$$

$$E_Q = A_Q \cdot e^{\left(j\frac{\pi}{2}(PH\_QL + PH\_QR + PHOffset\_Q)\right)} \cdot \sin\left(\frac{\pi}{2}V\_Q\right) \cdot \cos\left(\frac{\pi}{2}M\_Q\right)$$

$$A_I = [-1, 1], A_Q = [-1, 1], \text{ selectable.}$$

For the optimum bias control, one must find the set of minimum PH_IL, PH_IR, PH_QL, PH_QR, PH_PL, PH_PR for any given PHOffset_I, PHOffset_Q, PHOffset_P;

With constraints of: PH_IL−PH_IR+PHOffset_I=M_I=0, +/−2, +/−4 . . . , PH_QL−PH_QR+PHOffset_Q=M_Q=0, +/−2, +/−4 . . . ;

Given the freedom to select A_I/A_Q, . . . ;

Such that:

$$E = \sin\left(\frac{\pi}{2}V\_I\right) + e^{j\frac{\pi}{2}} \cdot \sin\left(\frac{\pi}{2}V\_Q\right)$$

provides the desired correct data constellation.

Conventionally, lithium niobate modulators are used which have (nearly) no restriction on the magnitude of PH_IL, PH_IR, PH_QL, PH_QR, PH_PL, PH_PR, so finding the desired correct data constellation was easy. The new InP technology has a relatively small phase adjustment range (limits on PH_IL, etc.). The physics of phase adjustment in InP (via free-carrier, thermal, Stark effect mechanisms) is much weaker than the linear electro-optic effect in lithium niobate. Furthermore, the phase controls are nonlinear, saturating, and accompanied by optical absorption (unlike lithium niobate). The latter is especially problematic, the optical absorption increases as the phase adjustment increases, degrading the extinction ratio in the modulator, and increasing the constellation distortion which hurts the transmitter optical performance.

Figure 4:
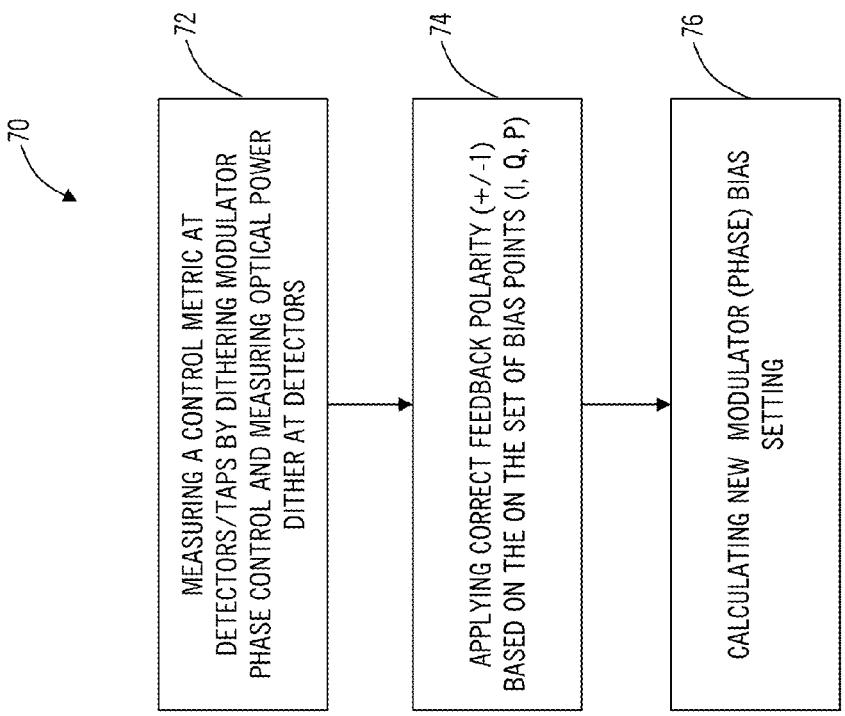
FIG. 4 is a flowchart of a generalized modulator bias control method which can be used in the optimum bias control described herein.

Referring to FIG. 4, in an exemplary embodiment, a flowchart illustrates a generalized modulator bias control method 70 which can be used in the optimum bias control described herein. The generalized modulator bias control method 70 includes measuring a control metric at detectors/taps by dithering modulator phase control and measuring optical power dither at detectors (step 72). This can be done via the various detectors 34, 36, 38, 44. The generalized modulator bias control method 70 also includes applying correct feedback polarity (+/−1) based on the on the set of bias points (I, Q, P) (step 74). Finally, the generalized modulator bias control method 70 includes calculating a new modulator (phase) bias setting (step 76). For example, a description covering modulator bias control methods is included in commonly assigned U.S. Patent Publ. No. 2010/0272446 entitled "CONTROL SYSTEM FOR A POLAR OPTICAL TRANSMITTER," the contents of which are incorporated by reference herein.

With respect to modulator bias nomenclature: "Min", "Max", "Quad"/"Half power" bias points, the optical electric field for one interferometer, say I: (and for one polarization) is:

$$E_I = A_I \cdot e^{(j\frac{\pi}{2}(PH\_IL+PH\_IR+PHOffset\_I))} \cdot \sin(\frac{\pi}{2}V\_I) \cdot \cos(\frac{\pi}{2}M\_I)$$

where PH_IL−PH_IR+PHOffset_I=M_I=0, +/−2, +/4, .... This equation was derived as follows:

$$E_I = e^{(j\frac{\pi}{2}(V+2PH\_L+2PHOffset))} - e^{(j\frac{\pi}{2}(-V+2PH\_R))} \quad \text{Eq. (1)}$$

$$E_I = e^{(j\frac{\pi}{2}(PH\_L+PH\_R+PHOffset))} \cdot \left[ \begin{array}{c} e^{(j\frac{\pi}{2}(V+PH_L-PH_R+PHOffset))} - \\ e^{(j\frac{\pi}{2}(-V-PH_L+PH_R-PHOffset))} \end{array} \right]$$

$$E_I = e^{(j\frac{\pi}{2}(PH\_L+PH\_R+PHOffset))} \cdot \left[ \begin{array}{c} e^{(j\frac{\pi}{2}(V+PH_L-PH_R+PHOffset))} - \\ e^{(-j\frac{\pi}{2}(V+PH_L-PH_R+PHOffset))} \end{array} \right]$$

$$E_I = e^{(j\frac{\pi}{2}(PH\_L+PH\_R+PHOffset))} \cdot \sin(\frac{\pi}{2}(V+PH\_L-PH\_R+PHOffset)),$$

where PHOffset=[−1:1] and is a random manufacturing phase.

$$E_I = e^{(j\frac{\pi}{2}(PH\_L+PH\_R+PHOffset))} \cdot \sin(\frac{\pi}{2}V)\cos(\frac{\pi}{2}(PH\_L-PH\_R+PHOffset)),$$

where PH_L−PH_R+PHOffset=0, +/−2, +/4 ... are possible bias points.

Starting from the original equation, Eq. (1):

$$E_I = e^{(j\frac{\pi}{2}(V+2PH\_L+2PHOffset))} - e^{(j\frac{\pi}{2}(-V+2PH\_R))}$$

The following assumptions can be made to simplify the mathematics:
PH_R=−PH_L=−PH/2, PHOffset=0, thereby simplifying the Eq. (1) as follows:

$$E_I = e^{(j\frac{\pi}{2}(V+PH))} - e^{(j\frac{\pi}{2}(-V-PH))} = 2j \cdot \sin(\frac{\pi}{2} \cdot (V+PH))$$

which results in the measured optical power of:

$$P = 4 \cdot \left[\sin(\frac{\pi}{2} \cdot (V+PH))\right]^2 = 2 \cdot (1-\cos(\pi \cdot (V+PH)))$$

which, assuming "DC", i.e. V=0 (no RF modulation) and normalizing, becomes $$P = \frac{1}{2} \cdot (1-\cos(\pi \cdot PH))$$

Therefore, a minimum "min" bias point is when PH=0, P=0, i.e. the minimum DC optical power; a maximum "max" bias point is when PH=1, P=1, i.e. the maximum DC optical power; and a quadrature "Quad" or "half power" bias point is when PH=0.5, P=0.5, i.e. the half-power point.

Figure 5A:
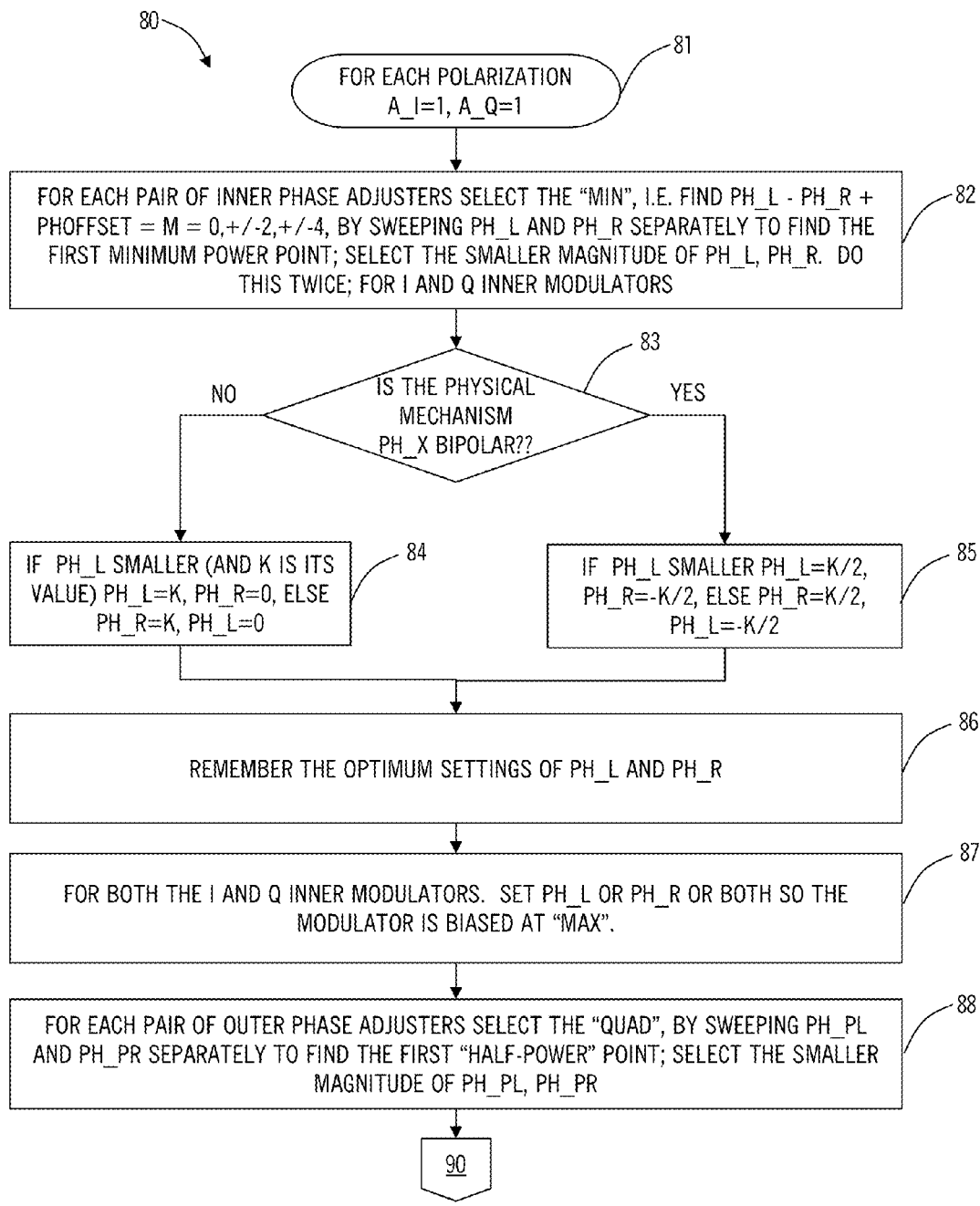
FIGS. 5A and 5B are a flowchart of an optimum bias control method 80 which is a local algorithm based on a set of constraints.
Figure 5B:
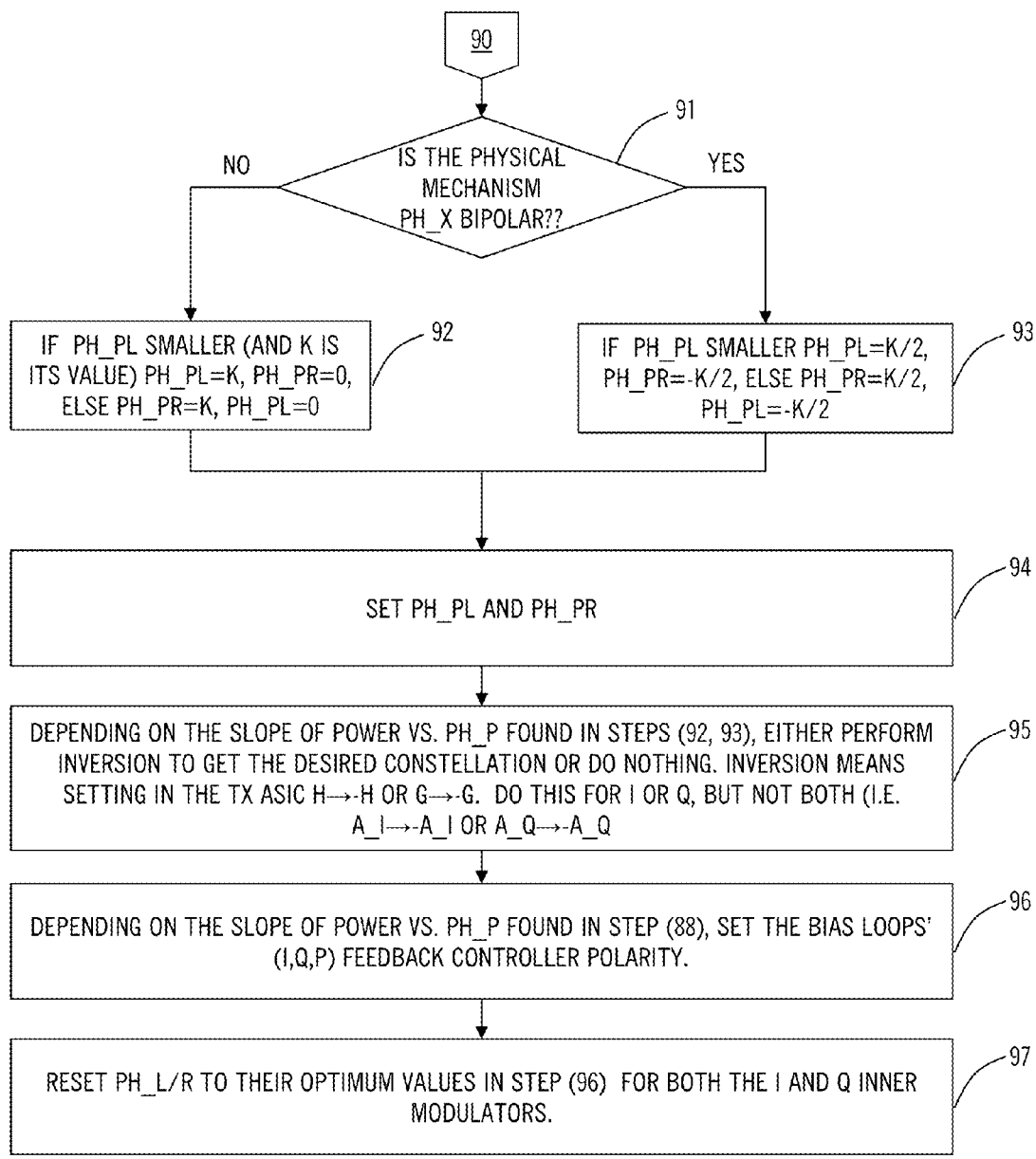

Referring to FIGS. 5A-5B, in an exemplary embodiment, a flowchart illustrates an optimum bias control method 80 based on the foregoing. Specifically, the optimum bias control method 80 utilizes the aforementioned "min" bias point, "max" bias point, and "half power" bias point to implement a local algorithm to find optimal bias settings for PH_XPR, PH_XPL, PH_YPR, PH_YPL, PH_XIR, PH_XIL, PH_XQR, PH_XQL, PH_YIR, PH_YIL, PH_YQR, and PH_YQL. Starting in FIG. 5A, the optimum bias control method 80 is performed for each polarization (A_I=1, A_Q=1) (step 81). The optimum bias control method 80 includes, for each pair of inner phase adjusters, selecting the "min", i.e. find PH_L−PH_R+PHOffset=M=0, +/−2, +/−4, by sweeping PH_L and PH_R separately to find the first minimum power point; select the smaller magnitude of PH_L, PH_R. Do this twice; for I and Q inner modulators (step 82). The step 82 can use any of the detectors 34, 36, 40, 44.

The optimum bias control method 80 can include a physical mechanism which allows PH_X (X=L or R) to be bipolar (i.e. PH_X can be positive or negative) (step 83). If the physical mechanism PH_X cannot be bipolar (step 83), if PH_L is smaller than PH_R (and PH_L=K) PH_L=K, PH_R=0, else PH_R=K, PH_L=0 (step 84). If the physical mechanism PH_X can be bipolar (step 83), if PH_L is smaller than PH_L (and PH_L=K), PH_L=K/2, PH_R=−K/2; else PH_R=K/2, PH_L=−K/2 (step 85). The steps 84, 85 yield the optimum settings of PH_L and PH_R and are remembered for later in the optimum bias control method 80 (step 86). The optimum bias control method 80, in general, could sweep differentially, but specifically to InP there is no advantage because none of the three common physical mechanisms for varying the phase (PH_L etc.) are bipolar, i.e. the phase control cannot change sign, only increase or decrease in magnitude (unlike lithium niobate). As an aside, in the case of Lithium Niobate modulators, the optimum bias control method 80 works equally well, but usually because of device physics PH_L=−PH_R and there is only one phase control that applies the phase differentially.

The optimum bias control method 80 includes a preparatory step of, for both the I and Q inner modulators, setting PH_L or PH_R or both so the modulator is biased at the "max" bias point (step 87). The optimum bias control method 80 next includes, for each pair of outer phase adjusters, selecting the "quad" bias point, by sweeping PH_PL and PH_PR separately to find the first "half-power" bias point; and selecting the smaller magnitude of PH_PL, PH_PR (step 88). The step 88 can only use Inner (X-Inner or Y-Inner) or Z detectors, i.e. the detectors 36, 40, 44. Next, the optimum bias control method 80 at step 90 proceeds to FIG. 5B.

In FIG. 5B, again, the optimum bias control method 80 can include a physical mechanism which allows PH_X (X=L or R) to be bipolar (i.e. PH_X can be positive or negative) (step 91). If the physical mechanism PH_X cannot be bipolar (step 91), if PH_PL is smaller than PH_PR (and PH_PL=K), the PH_PL=K, PH_PR=0, else PH_PR=K, PH_PL=0 (step 92). If the physical mechanism PH_X can be bipolar (step 91), if PH_PL is smaller than PH_PR (and PH_PL=K), then PH_PL=K/2, PH_PR=−K/2, else PH_PR=K/2, PH_PL=−K/2 (step 93). The values of PH_PL and PH_PR are set (step 94). Depending on the slope of power vs. PH_P found in steps 88, 92, 93, either perform inversion to get the desired constellation or do nothing (step 95). Inversion is performed via the data inversion control 58 and includes setting in the Tx ASIC 20 H→−H or G→−G. This is done for I or Q, but not both (i.e. A_I→−A_I or A_Q→−A_Q). Subsequent to the step 95, the optimum bias control method 80, depending on the slope of power vs. PH_P found in steps 88, 92, 93, sets the bias loops' (I, Q, P) feedback controller polarity (step 96). Finally, the optimum bias control method 80 resets PH_L/R to their optimum values in step 86 for both the I and Q inner modulators (step 97).

The optimum bias control method 80 can be implemented in the optical modulator system 10 providing a coherent optical transmitter with optimum modulator bias selection, a coherent optical transmitter with Tx ASIC signal processing and a generalized QPMZ modulator, in conjunction with, a method to select the correct bias points of the optical modulator using the least phase adjustment range possible, enabling many types of optical modulators to be used and with better performance. Advantageously, the systems and methods maximize the performance of the optical modem and allow a wider choice of vendors/technologies [i.e. different lithium niobate modulator vendors; InP photonic integration technologies]. In particular, the new InP technology is prized for its small size and anticipated lower cost (and consequently is proposed to be used in next gen small-form-factor pluggable optics). Furthermore, the optimum bias control method 80 provides an efficient and local algorithm to find the 12 particular bias points in the QPMZ modulator 12 with particular constraints and applying a minimum amount of control. Advantageously, the optimum bias control method 80 is a local algorithm in that it does not require an iterative analysis of a set of parameter; rather they are set one at a time. The optimum bias control method 80 can be implemented at startup to find the optimal bias points.

In an exemplary embodiment, the optimum bias control method 80 can be implemented in an InP modulator such as the QPMZ modulator 12 or the like. In the lithium niobate case, typically, the inner control points (e.g., PH_XIR, PH_XIL, PH_XQR, PH_XQL, PH_YIR, PH_YIL, PH_YQR, and PH_YQL) are biased at a first NULL, of the correct polarity, closest to zero voltage (and the polarity alternates for adjacent nulls). The optimum bias control method 80 breaks the constraint of requiring a specific polarity (thus the use of data inversion as a part of the optimum bias control method 80). In the systems and methods described herein, the InP modulator would bias at the first null; polarity is ignored, and in fact does not have the same meaning. Generally with respect to phase control: InP modulators are biased as "separate" phase controls (e.g. PH_L and PH_R are separate and independent) whereas lithium niobate modulators are typically biased as push-pull (PH_L=–PH_R). This means that finding the optimum set of bias points does have more degrees of freedom to search with InP.

An exemplary benefit of the systems and methods described herein is it is a local search (i.e., optimize separately and sequentially I, Q, P/outer; no iterations back to I) and exploiting one extra degree of freedom (i.e., data inversion). Further, the systems and methods are more efficient than other types of searches which could be used such as a generalized search (e.g. for a 40/100G lithium niobate based system, sweep I, Q, P . . . 3D sweep and select) or an iterative search (lithium niobate), i.e. choose {I nearest, Q nearest, P nearest}; swap I to second nearest, is I or P improved? etc. Along with data inversion, this can give an optimum result—generalized search with data inversion (e.g. sweep I, Q, P+data inversion . . . 3D+1 sweep and select) and iterative search, i.e. choose {I nearest, Q nearest, P nearest}; swap I to nearest opposite polarity (if closer), invert data, is I or P improved? etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A modulator bias selection method for setting bias values in an optical modulator system of an optical transmitter, comprising:

for a pair of inner phase adjusters of an optical modulator, selecting a minimum bias point by sweeping a left phase adjuster and a right phase adjuster of each of the inner phase adjusters and measuring a resulting bias point in the optical modulator system until the minimum bias point is found;

for a pair of outer phase adjusters, selecting a half-power bias point by sweeping a left phase adjuster and a right phase adjuster of each of the outer phase adjusters and measuring a resulting bias point in the optical modular system until the half-power bias point is found; and setting bias values for the pair of inner phase adjusters and the pair of outer phase adjusters based on the selected minimum bias point and the selected half-power bias point, wherein the modulator bias selection method is performed locally at the optical modulator system.

2. The modulator bias selection method of claim 1, further comprising:

for each polarization, in-phase and quadrature, of the optical modulator, selecting the minimum bias point, selecting the half-power bias point, and setting the bias values.

3. The modulator bias selection method of claim 1, further comprising:
using any one of a plurality of detectors of the optical modulator system to find the minimum bias point; and
using one of an inner detector of the plurality of detectors and an external detector of the plurality of detectors to find the half-power bias point.

4. The modulator bias selection method of claim 1, further comprising:
selecting the minimum bias point when a phase of a left phase amount minus a right phase amount plus an offset phase amount equals 0, +/−2, +/−4, . . . ; and
selecting a smaller of a magnitude of the left phase amount and the right phase amount for the setting step.

5. The modulator bias selection method of claim 1, further comprising:
prior to selecting the half-power bias point, setting a left phase adjuster and a right phase adjuster of each of the inner phase adjusters such that the optical modulator is biased at a maximum bias point.

6. The modulator bias selection method of claim 1, wherein for the inner phase adjusters PH_L is a value of the left phase adjuster at the minimum bias point and PH_R is a value of the right phase adjuster at the minimum bias point;
wherein for the outer phase adjusters PH_PL is a value of the left phase adjuster at the half-power bias point and PH_PR is a value of the right phase adjuster at the half-bias point; and the method further comprising:
if the optical modulator is bipolar, performing the steps of:
selecting values for the inner phase adjusters based on if PH_L is smaller than PH_R and PH_L=K, then PH_L=K/2 and PH_R=−K/2, else PH_R=K/2 and PH_L=−K/2; and
selecting values for the outer phase adjusters based on if PH_PL smaller than PH_PR and PH_PL=K, then PH_PL=K/2 and PH_PR=−K/2, else PH_PR=K/2, PH_PL=−K/2; and
if the optical modulator is not bipolar, performing the steps of:
selecting for the inner phase adjusters values based on if PH_L is smaller than PH_R and PH_L=K, then PH_L=K and PH_R=0, else PH_R=K and PH_L=0; and
selecting for the output phase adjusters based on if PH_PL smaller than PH_PR and PH_PL=K, then PH_PL=K and PH_PR=0, else PH_PR=K, PH_PL=0.

7. The modulator bias selection method of claim 6, further comprising:
selecting the minimum bias point when a phase of a left phase amount minus a right phase amount plus an offset phase amount equals 0, +/−2, +/−4, . . . ;
selecting a smaller of a magnitude of the left phase amount and the right phase amount for setting the bias values; and
if the optical modulator is bipolar, dividing the smaller of the magnitude of the left phase amount and the right phase amount by two and setting the other magnitude to a same value with a negative sign.

8. The modulator bias selection method of claim 1, further comprising:
depending on a slope of power versus phase in selecting the half-power bias point, selectively performing data inversion in circuitry of the optical modulator system to get a desired constellation;
wherein the data inversion comprises one of inverting a transfer function in a digital filter coupled to a digital input or inverting an analog amplifier gain of an analog amplifier coupled to an analog output.

9. The modulator bias selection method of claim 8, wherein the data inversion is selectively performed either for an in-phase component or a quadrature component.

10. The modulator bias selection method of claim 1, further comprising:
setting feedback controller polarity based on a slope of power versus phase in selecting the half-power bias point.

11. The modulator bias selection method of claim 1, wherein the optical modulator comprises a lithium niobate optical modulator.

12. The modulator bias selection method of claim 1, wherein the optical modulator comprises an indium phosphate optical modulator.

13. The modulator bias selection method of claim 1, wherein the optical modulator comprises a quad-parallel Mach-Zehnder modulator.

14. A coherent optical transmitter, comprising:
an optical modulator system comprising a plurality of modulators and a plurality of detectors configured to monitor outputs of the plurality of modulators;
a modulator bias controller communicatively coupled to the plurality of detectors and configured to provide phase bias control to a plurality of phase adjusters of the plurality of modulators;
transmitter circuitry configured to receive a digital input from and configured to provide an analog output to the plurality of modulators; and
wherein the optical modulator system, the modulator bias controller, and the transmitter circuitry are configured to locally select optimum phases for the plurality of phase adjusters using a non-iterative process.

15. The coherent optical transmitter of claim 14, wherein the transmitter circuitry comprises:
a digital transfer function, H, applied to the digital input;
a digital to analog converter configured to receive an output of the digital transfer function, H; and
an analog amplifier with gain, G, configured to receive an output of the digital to analog converter;
wherein the plurality of modulators are bipolar, and wherein data inversion is selectively performed on one of the gain, G, and the digital transfer function, H, to achieve a desired constellation.

16. The coherent optical transmitter of claim 14, wherein the transmitter circuitry and the modulator bias controller:
for a pair of inner phase adjusters of the optical modulator system, select a minimum bias point by sweeping a left phase adjuster and a right phase adjuster of each of the inner phase adjusters and measuring a resulting bias point in the optical modulator system until the minimum bias point is found;
for a pair of outer phase adjusters, selecting a half-power bias point by sweeping a left phase adjuster and a right phase adjuster of each of the outer phase adjusters and measuring a resulting bias point in the optical modulator system until the half-power bias point is found; and
setting bias values for the pair of inner phase adjusters and the pair of outer phase adjusters based on the selected minimum bias point and the selected half-power bias point.

17. The coherent optical transmitter of claim 16, wherein any one of the plurality of detectors is used to find the minimum bias point; and wherein one of an inner detector of the plurality of detectors and an external detector of the plurality of detectors is used to find the half-power bias point.

18. The coherent optical transmitter of claim 16, wherein for the inner phase adjusters PH_L is a value of the left phase adjuster at the minimum bias point and PH_R is a value of the right phase adjuster at the minimum bias point;

wherein for the outer phase adjusters PH_PL is a value of the left phase adjuster at the half-power bias point and PH_PR is a value of the right phase adjuster at the half-bias point; and wherein the transmitter circuitry and the modulator bias controller perform the steps of:

if the optical modulator is bipolar:

selecting values for the inner phase adjusters based on if PH_L is smaller than PH_R and PH_L=K, then PH_L=K/2 and PH_R=−K/2, else PH_R=K/2 and PH_L=−K/2; and selecting values for the outer phase adjusters based on if PH_PL smaller than PH_PR and PH_PL=K, then PH_PL=K/2 and PH_PR=−K/2, else PH_PR=K/2, PH_PL=−K/2; and if the optical modulator is not bipolar:

selecting for the inner phase adjusters values based on if PH_L is smaller than PH_R and PH_L=K, then PH_L=K and PH_R=0, else PH_R=K and PH_L=0; and selecting for the output phase adjusters based on if PH_PL smaller than PH_PR and PH_PL=K, then PH_PL=K and PH_PR=0, else PH_PR=K, PH_PL=0.

19. An optical modulator, comprising:

N phase adjusters;

M detectors associated with the N phase adjusters, N≥M;

circuitry communicatively coupled to the N phase adjusters and the M detectors, wherein the circuitry is configured to:

for a pair of inner adjusters of the N phase adjusters, select a minimum bias point by sweeping a left phase adjuster and a right phase adjuster of each of the inner adjusters and measuring a resulting bias point in the optical modulator until minimum bias point is found, where a phase of a left phase amount minus a right phase amount plus an offset phase amount equals 0, +/−2, +/−4, . . . ;

for a pair of outer phase adjusters of the N phase adjusters, select a half-power bias point by sweeping a left phase adjuster and a right phase adjuster of each of the outer phase adjusters and measuring a resulting bias point in the optical modulator until the half-power bias point is found; and set bias values for the pair of inner phase adjusters and the pair of outer phase adjusters based on the selected minimum bias point and the selected half-power bias point.

20. The optical modulator of claim 19, wherein the optical modulator is a quad-parallel Mach-Zehnder modulator.

* * * * *